US010248324B2

(12) United States Patent
Pass et al.

(10) Patent No.: US 10,248,324 B2
(45) Date of Patent: Apr. 2, 2019

(54) OBLIVIOUS PARALLEL RANDOM ACCESS MACHINE SYSTEM AND METHODS

(71) Applicant: Cornell University, Ithaca, NY (US)

(72) Inventors: Rafael Pass, Brooklyn, NY (US); Elette Boyle, Tel Aviv (IL); Kai-Min Chung, New Taipei (TW)

(73) Assignees: Cornell University, Ithaca, NY (US); Technion Research & Development Limited (IL); Academia Sinica (TW)

( * ) Notice: Subject to any disclaimer, the term of this patent is extended or adjusted under 35 U.S.C. 154(b) by 47 days.

(21) Appl. No.: 15/329,730

(22) PCT Filed: Jul. 31, 2015

(86) PCT No.: PCT/US2015/043210
§ 371 (c)(1),
(2) Date: Jan. 27, 2017

(87) PCT Pub. No.: WO2016/019294
PCT Pub. Date: Feb. 4, 2016

(65) Prior Publication Data
US 2017/0212679 A1     Jul. 27, 2017

Related U.S. Application Data

(60) Provisional application No. 62/031,616, filed on Jul. 31, 2014.

(51) Int. Cl.
*G06F 12/00*     (2006.01)
*G06F 3/06*      (2006.01)
(Continued)

(52) U.S. Cl.
CPC ............ *G06F 3/061* (2013.01); *G06F 3/0604* (2013.01); *G06F 3/0623* (2013.01);
(Continued)

(58) Field of Classification Search
CPC ...... G06F 3/061; G06F 3/0604; G06F 3/0623; G06F 3/0638; G06F 3/0652;
(Continued)

(56) References Cited

U.S. PATENT DOCUMENTS

| 8,700,906 B2 | 4/2014 | Kamara et al. |
| 2008/0084889 A1 | 4/2008 | Archer |

(Continued)

FOREIGN PATENT DOCUMENTS

| CN | 101895530 | 11/2012 |

OTHER PUBLICATIONS

Boyle et al., Large-Scale Secure Computation, 2014, IACR Cryptology ePrint Archive, entire document, especially Abstract and pp. 23-28 (Year: 2014).*

(Continued)

*Primary Examiner* — Shawn X Gu
(74) *Attorney, Agent, or Firm* — Valauskas Corder LLC

(57) ABSTRACT

A secure parallel processing technique for converting any parallel random access machine (PRAM) into an oblivious parallel random access machine (OPRAM), whose distribution of memory accesses is statistically independent of the data (with negligible error), while only inducing a polylogarithmic slowdown to both the total and parallel complexities of the program.

11 Claims, 21 Drawing Sheets

(51) Int. Cl.
| | |
|---|---|
| G06F 13/16 | (2006.01) |
| G06F 12/084 | (2016.01) |
| G06F 12/0842 | (2016.01) |
| G06F 12/1072 | (2016.01) |
| G06F 13/38 | (2006.01) |

(52) U.S. Cl.
CPC .......... *G06F 3/0638* (2013.01); *G06F 3/0652* (2013.01); *G06F 3/0673* (2013.01); *G06F 12/084* (2013.01); *G06F 12/0842* (2013.01); *G06F 12/1072* (2013.01); *G06F 13/1663* (2013.01); *G06F 13/387* (2013.01)

(58) Field of Classification Search
CPC .. G06F 3/0673; G06F 13/1663; G06F 12/084; G06F 12/0842; G06F 12/1072
See application file for complete search history.

(56) References Cited

U.S. PATENT DOCUMENTS

| | | | |
|---|---|---|---|
| 2008/0133841 A1 | 6/2008 | Finkler | |
| 2012/0221808 A1* | 8/2012 | Coon | G06F 12/084 711/154 |
| 2014/0007250 A1* | 1/2014 | Stefanov | G06F 21/60 726/26 |

OTHER PUBLICATIONS

Georgiou et al. Failure-Sensitive Analysis of Parallel Algorithms With Controlled Memory Access Concurrency, 2007, Parallel Processing Letters, entire document, especially Abstract and pp. 4-8 (Year: 2007).*

Lorch et al . Toward Practical Private Access to Data Centers via Parallel ORAM, 2012, IACR Cryptology ePrint Archive, entire document, especially Abstract, pp. 2-3 and 5-8 (Year: 2012).*

Georgiou et al. "Failure-Sensitive Analysis of Parallel Algorithms With Controlled Memory Access Concurrency" Parallel Processing Letters, 2007 (online] [retrieved on Oct. 9, 2015 (Oct. 9, 2015)] Retrieved from the Internet <URL: http:I/citeseerx.ist.psu.edu/viewdoc/summary?doi=10.1.1.78.2425>, entire document, especially Abstract; p. 4-8.

Boyle et al. "Large-Scale Secure Computation" IACR Cryptology ePrint Archive, May 31, 2014 [online] [retrieved on Oct. 9, 2015 (Oct. 9, 2015)] Retrieved from the Internet—<URL: https://eprinl.iacr.org/2014/404.pdf>, entire document, especially Abstract; p. 23-28.

Lorch et al. "Toward Practical Private Access to Data Centers via Parallel ORAM" IACR Cryptology ePrint Archive, 2012 (online] [retrieved on Oct. 9, 2015 (Oct. 9, 2015)] Retrieved from the Internet <URL: http://citeseerx.ist.psu.edu/viewdoc/summary?doi=10.1.1.303.9883>. Entire document, especially Abstract; p. 2-3 and 5-8.

Boyle et al. "Oblivious Parallel RAM and Applications", Jul. 13, 2015. Retrieved from the Internet <URL:https://eprint.iacr.org/2014/404.pdf>.

Peter Laud "Parallel Oblivious Array Access for Secure Multiparty Computation and Privacy-Preserving Minimum Spanning Trees", 2015, Retrieved from the Internet—<URL:http://www.degruyter.com/dg/viewarticle.fullcontentlink:pdfeventlink/$002fj$002fpopets.2015.2015.issue-2$002fpopets-2015-0011$002fpopets-2015-0011.pdf?t:ac=j$002fpopets.2015.2015.issue-2$002fpopets-2015-0011$002fpopets-2015-0011.xml>.

Marcel Keller "The Oblivious Machine or: How to Put the C into MPC", May 17, 2015, Retrieved from the Internet—<URL: https://eprint.iacr.org/2015/467.pdf>.

Saia et. al "Recent Results in Scalable Multi-Party Computation", 2014, Retrieved from the Internet—<URL:https://eprint.iacr.org/2014/872.pdf>.

* cited by examiner

225

300

Heavy-OPAccess($t, (r_i, v_i)$): The Large Bandwidth Case
To be executed by $m$ processors $CPU_1, \ldots, CPU_m$ w.r.t. (recursive) database size $n_t := n/(\alpha^t)$.

Input: Each $CPU_i$ holds: recursion level $t$, instruction pair $(r_i, v_i)$ with $r_i \in [n_t]$, global parameter $\alpha$.

Each $CPU_i$ performs the following steps, in parallel:

0. Exit Case: If $t \geq \log_\alpha n$, return $()$.
   This corresponds to requesting the (trivial) position map for a block within a single-leaf tree.

1. Conflict Resolution
   (a) Broadcast the instruction pair $(r_i, v_i)$ to all CPUs.
   (b) Let $b_i = \lceil r_i/\alpha \rceil$. Locally aggregate incoming instructions to block $b_i$ as $\tilde{v}_i = \tilde{v}_i[1] \ldots \tilde{v}_i[\alpha]$, resolving write conflicts (i.e., $\forall s \in [\alpha]$, take $\tilde{v}_i[s] \leftarrow v_j$ for minimal $j$ such that $r_j = b_i \cdot \alpha + s$).
   Denote by $\text{rep}(b_i) := \min\{j : \lceil r_j/\alpha \rceil = b_i\}$ the smallest index $j$ of any CPU whose $r_j$ is in this block $b_i$. (CPU $\text{rep}(b_i)$ will actually access $b_i$, while others perform dummy accesses).

2. Recursive Access to Position Map
   If $i = \text{rep}(b_i)$: Sample fresh leaf id $\ell'_i \leftarrow [n_t]$. Recurse as $\ell_i \leftarrow$ Heavy-OPAccess$(t+1, (b_i, \ell'_i))$ to read the current value $\ell_i$ of $\text{Pos}(b_i)$ and rewrite it with $\ell'_i$.

Else: Recursively initiate dummy access $x \leftarrow$ Heavy-OPAccess$(t+1, (1, \perp))$ at arbitrary address (say 1); ignore the read value $x$. Sample a fresh random leaf id $\ell'_i \leftarrow [n_t]$ for a dummy lookup.

3. Look Up Current Memory Values

Read the memory contents of all buckets down the path to leaf node $\ell_j$ defined in the previous step, copying all buckets into local memory.

If $i = \text{rep}(b_j)$: locate and store target block triple $(b_i, v_i^{old}, \ell_j)$. Update $\bar{v}$ from Step 1 with existing data: $\forall s \in [p]$, replace any non-written cell values $\bar{v}_j[s] = \emptyset$ with $\bar{v}_j[s] \leftarrow v_i^{old}[s]$. $\bar{v}_j$ now stores the entire data block to be rewritten for block $b_j$.

4. Remove Old Data from ORAM Database (a) If $i = \text{rep}(b_j)$: Broadcast $(b_i, \ell_j)$ to all CPUs. Otherwise: broadcast $(\bot, \ell_j)$.

(b) Initiate UpdateBuckets $(n_4, \{(\text{remove-}b_j, \ell_j)\}_{j \in [m]\setminus(q)})$, as in Figure 4.

5. Insert New Data into Database in Parallel (a) If $i = \text{rep}(b_j)$: Broadcast $(b_i, \bar{v}_j, \ell_j)$ with updated value $\bar{v}_j$ and target leaf $\ell_j$.

(b) Let $\text{lev}^* := \lfloor \log(\min\{m, n_4\}) \rfloor$ be the ORAM tree level with number of buckets equal to number of CPUs (the level where data will be inserted). Locally aggregate all incoming instructions whose path $\ell_j$ has $\text{lev}^*$-bit prefix $i$: $\text{Insert}_i := \{((b_j, \bar{v}_j, \ell_j) : (\ell_j)^{(\text{lev}^*)} = i\}$.

(c) Access memory bucket $i$ (at level $\text{lev}^*$) and rewrite contents, inserting data items $\text{Insert}_i$. If bucket $i$ exceeds its capacity, abort with overflow.

4. Remove Old Data from ORAM Database (a) If $i = \text{rep}(b_i)$: Broadcast $(b_i, \ell_i)$ to all CPUs. Otherwise: broadcast $(\bot, \ell_i)$.
   (b) Initiate UpdateBuckets $(n_i, (\text{remove-}b_i, \ell_i), \{(\text{remove-}b_j, \ell_j)\}_{j \in (m)\setminus(i)})$, as in Figure 4.

5. Insert New Data into Database in Parallel (a) If $i = \text{rep}(b_i)$: Broadcast $(b_i, \tilde{v}_i, \ell'_i)$, with updated value $\tilde{v}_i$ and target leaf $\ell'_i$.
   (b) Let $\text{lev}^* := \lfloor \log(\min\{m, n_4\}) \rfloor$ be the ORAM tree level with number of buckets equal to number of CPUs (the level where data will be inserted). Locally aggregate all incoming instructions whose path $\ell'_j$ has $\text{lev}^*$-bit prefix $i$: $\text{Insert}_i := \{(b_j, \tilde{v}_j, \ell'_j) : (\ell'_j)|\text{lev}^*) = i\}$.
   (c) Access memory bucket $i$ (at level $\text{lev}^*$) and rewrite contents, inserting data items $\text{Insert}_i$. If bucket $i$ exceeds its capacity, abort with overflow.

6. Flush the ORAM Database (a) Sample a random leaf node $\ell_q^{\text{flush}} \leftarrow [n_4]$ along which to flush. Broadcast $\ell_q^{\text{flush}}$.
   (b) If $i \leq n_t$: Initiate UpdateBuckets $(n_i, (\text{flush}, \ell_i^{\text{flush}}), \{(\text{flush}, \ell_j^{\text{flush}})\}_{j \in (m)\setminus(i)})$, as in Figure 4. Recall that flush means to "push" each encountered triple $(b, \ell, v)$ down to the lowest point at which his chosen flush path and $\ell$ agree.

7. Update CPUs
   If $i = \text{rep}(b_i)$: broadcast the *old* value $v_i^{\text{old}}$ of block $b_i$ to all CPUs.

FIG. 5C

UpdateBuckets($n_a$, (mycommand, mypath), {(command$_j$, path$_j$)}$_{j \in [m] \setminus \{i\}}$)
Let path$^{(0)}$, . . . , path$^{(\log n_a)}$ denote the bit prefixes of length 0 (i.e., ∅) to $\log n_a$ of path.

For each tree level lev = 0 to $\log n_a$, each CPU $i$ does the following at bucket mypath$^{(lev)}$:

1. Define CPUs(mypath$^{(lev)}$) := {$i$} ∪ {$j$ : path$_j^{(lev)}$ = mypath$^{(lev)}$} to be the set of CPUs requesting changes to bucket mypath$^{(lev)}$. Let bucket-rep(mypath$^{(lev)}$) denote the *minimal* index in the set.

2. If $i \neq$ bucket-rep(mypath$^{(lev)}$), do nothing. Otherwise:

Case 1: mycommand$_i$ = remove-$b_i$.
   Interpret each command$_j$ = remove-$b_j$ as a target block id $b_j$ to be removed. Access memory bucket mypath$^{(lev)}$ and rewrite contents, removing any block $b_j$ for which $j \in$ CPUs(mypath$^{(lev)}$).

Case 2: mycommand = flush.

Define Flush $\subset \{L, R\}$ as $\{v : \exists \text{path}_j \text{ s.t. } \text{path}_j^{(\text{lev}+1)} \equiv \text{mypath}^{(\text{lev})}||v\}$, associating $L \equiv 0$, $R \equiv 1$. This determines whether data will be flushed left and/or right from this bucket. Access memory bucket mypath$^{(\text{lev})}$; denote its collection of stored data blocks $b$ by ThisBucket. Partition ThisBucket = ThisBucket-L $\cup$ ThisBucket-R into those blocks whose associated leaves continue to the left or right (i.e., ThisBucket-L := $\{b_j \in \text{ThisBucket} : \ell_j^{(\text{lev}+1)} = \text{mypath}^{(\text{lev})}||0\}$, and similar for 1).

- If $L \in$ Flush, then set ThisBucket $\leftarrow$ ThisBucket $\setminus$ ThisBucket-L, access memory bucket mypath$^{(\text{lev})}||0$, and insert data items ThisBucket-L into it.
- If $R \in$ Flush, then set ThisBucket $\leftarrow$ ThisBucket $\setminus$ ThisBucket-R, access memory bucket mypath$^{(\text{lev})}||1$, and insert data items ThisBucket-R into it.

Rewrite the contents of bucket mypath$^{(\text{lev})}$ with updated value of ThisBucket. If any bucket exceeds its capacity, abort with overflow.

FIG. 6B

UpdateBuckets($m_i$, (command$_i$, path$_i$))
Let path$^{(1)}$, path$^{(2)}$, ..., path$^{(\log n)}$ denote the bit prefixes of length 1 to log $n$ of path.
For each level lev = 1, ..., log $n$ of the tree:

1. The CPUs invoke the oblivious aggregation procedure ObliveAgg as follows.

Case 1: command$_i$ = remove-$b_i$.
   Each CPU $i$ sets key$_i$ = path$_i^{(\text{lev})}$ and data$_i$ = $b_i$ if $b_i$ is in the bucket of node $\ell_i^{(\text{lev})}$, and data$_i$ = $\perp$ otherwise. Use the union function Agg({data$_i$}) = {$b$ : $\exists$data$_i$ = $b$} as the aggregation function.

Case 2: command$_i$ = flush.
   Each CPU $i$ sets key$_i$ = path$_i^{(\text{lev})}$ and data$_i$ = $L$ (resp., $R$) if the (lev + 1)-st bit of path$_i$ is 0 (resp., 1). Use the union function as the aggregation function.

At the conclusion of the protocol, each bucket path$_i^{(\text{lev})}$ is assigned to a representative CPU bucket-rep(path$_i^{(\text{lev})}$) with aggregated commands agg-command$_i$.

2. Each representative CPU performs the updates:

If $i \neq$ bucket-rep(path$_i^{(lev)}$), do nothing. Otherwise:

Case 1: command$_i$ = remove-$b_i$.
Remove all blocks $b \in$ agg-command$_j$ in the bucket path$_i^{(lev)}$ by accessing memory bucket path$_i^{(lev)}$ and rewriting contents.

Case 2: command$_i$ = flush.
Access memory buckets path$_i^{(lev)}$, path$_i^{(lev)}$||0, path$_i^{(lev)}$||1, perform flush operation locally according to agg-command$_j$ $C = \{L, R\}$, and write the contents back.
Specifically, denote the collection of stored data blocks $b$ in path$_i^{(lev)}$ by ThisBucket. Partition ThisBucket = ThisBucket-L ⊔ ThisBucket-R into those blocks whose associated leaves continue to the left or right (i.e., $\{b_j \in$ ThisBucket : $\ell_j^{(lev+1)} =$ mypath$^{(lev)}$||0}, and similar for 1).

- If $L \in$ agg-command$_j$, then set ThisBucket ← ThisBucket \ ThisBucket-L, and insert data items ThisBucket-L into bucket path$_i^{(lev)}$||0.
- If $R \in$ agg-command$_j$, then set ThisBucket ← ThisBucket \ ThisBucket-R, and insert data items ThisBucket-L into bucket path$_i^{(lev)}$||0.

FIG. 7B

Oblivious Aggregation Procedure OblivAgg (w.r.t. Agg)
Input: Each CPU $i \in [m]$ holds a pair (key$_i$, data$_i$).
Output: Each CPU $i \in [m]$ outputs a triple (rep$_i$, key$_i$, aggdata$_i$) corresponding to either (dummy, $\perp$, $\perp$) or with aggdata$_i$ = Agg({data$_j$ : key$_j$ = key$_i$}), as further specified in Section 3.1.

1. Sort on key. Each CPU$_i$ initializes a triple (sourceid$_i$, keytemp$_i$, datatemp$_i$) ← ($i$, key$_i$, data$_i$).
   For each layer $L_1, \ldots, L_d$ in the sorting network:
   - Let $L_\ell = ((i_1, j_1), \ldots, (i_{m/2}, j_{m/2}))$ be the comparators in the current layer $\ell$.
   - In *parallel*, for each $t \in [m/2]$, the corresponding pair of CPUs $(CPU_{i_t}, CPU_{j_t})$ perform the following pairwise sort w.r.t. key:

If keytemp$_{j_t}$ < keytemp$_{i_t}$, then swap (sourceid$_{i_t}$, keytemp$_{i_t}$, datatemp$_{i_t}$) ↔ (sourceid$_{j_t}$, keytemp$_{j_t}$, datatemp$_{j_t}$).

2. Aggregate to left. For $i = 0, 1, \ldots, \log m$:
   - (Pass to left). Each $CPU_i$ for $i > 2^i$ sends his current pair (keytemp$_i$, datatemp$_i$) to $CPU_{i-2^i}$.
   - (Aggregate). Each $CPU_i$ for $i < m - 2^i$ receiving a pair (keytemp$_j$, datatemp$_j$) will aggregate it into own pair if the keys match. That is, if keytemp$_i$ = keytemp$_j$, then set datatemp$_i$ ← Agg(datatemp$_i$, datatemp$_j$). In both cases, the received pair is then erased.

The left-most $CPU_i$ with keytemp$_i$ = key now has Agg({datatemp$_j$ : keytemp$_j$ = key})).

3. Identify representatives. For each value $key_j$, the left-most CPU $i$ currently holding $keytemp_i = key_j$ will identify himself as (temporary) representative.

* Each $CPU_i$ for $i < m$: send $keytemp_i$ to right-hand neighbor, $CPU_{i+1}$.
   * Each $CPU_i$ for $i > 1$: If the received value $keytemp_{i-1}$ matches his own $keytemp_i$, then set $rep_i \leftarrow$ "dummy" and zero out $keytemp_i \leftarrow \perp$, $datatemp_i \leftarrow \perp$. Otherwise, set $rep_i \leftarrow$ "rep". ($CPU_1$ always sets $rep_1 \leftarrow$ "rep").

4. Reverse sort (i.e., sort on sourceid). Return aggregated data to a requesting CPU. For each layer $L_1, \ldots, L_d$ in the sorting network:

* Let $L_\ell = ((i_1, j_1), \ldots, (i_{m/2}, j_{m/2}))$ be the comparators in the current layer $\ell$.
   * Each $CPU_i$ initializes $idtemp \leftarrow sourceid_i$. In *parallel*, for each $t \in [m/2]$, the corresponding pair of CPUs ($CPU_{i_t}, CPU_{j_t}$) perform the following pairwise sort w.r.t. sourceid:

If $idtemp_{j_t} < idtemp_{i_t}$, then swap $(idtemp_{i_t}, rep_{i_t}, keytemp_{i_t}, datatemp_{i_t}) \leftrightarrow (idtemp_{j_t}, rep_{j_t}, keytemp_{j_t}, datatemp_{j_t})$.

At the conclusion, each $CPU_i$ holds a tuple $(idtemp_i, rep_i, keytemp_i, datatemp_i)$ with $idtemp_i = i$ and $keytemp_i = key_i$.

5. Output. Each $CPU_i$ outputs the triple $(rep_i, key_i, datatemp_i)$.

FIG. 10B

Oblivious Multicasting Procedure OblivMCast

Input: Each CPU $i$ holds $(key_i, data_i)$ with the following promise. Let $K = \bigcup\{key_i\}$ denote the set of distinct keys. For every key $\in K$, there exists a unique agent $i$ with $key_i = key$ such that $data_i \neq \bot$; let $data_{key}$ denote such $data_i$.

Output: Each agent $i$ outputs $out_i := (key_i, data_{key_i})$.

1. Sort on $(key_i, data_i)$. Each $CPU_i$ initializes $(sourceid_i, keytemp_i, datatemp_i) \leftarrow (i, key_i, data_i)$. For each layer $L_1, \ldots, L_d$ in the sorting network:
   - Let $L_\ell = ((i_1, j_1), \ldots, (i_{m/2}, j_{m/2}))$ be the comparators in the current layer $\ell$.
   - In *parallel*, for each $t \in [m/2]$, the corresponding pair of CPUs $(CPU_{i_t}, CPU_{j_t})$ perform the following pairwise sort w.r.t. key, additionally pushing payloads $data_{key}$ to the left.
     If (i) $keytemp_{j_t} < keytemp_{i_t}$, or (ii) $keytemp_{j_t} = keytemp_{i_t}$ and $datatemp_{j_t} \neq \bot$, then swap $(sourceid_{i_t}, keytemp_{i_t}, datatemp_{i_t}) \leftrightarrow (sourceid_{j_t}, keytemp_{j_t}, datatemp_{j_t})$.

2. Multicast to right. For $t = 0, 1, \ldots, \log m$:
   - (Pass to right). Each $CPU_i$ for $i \leq m - 2^t$ sends his current pair $(keytemp_i, datatemp_i)$ to $CPU_{i+2^t}$.
   - (Aggregate). Each $CPU_i$ for $i > 2^t$ receiving a pair $(keytemp_j, datatemp_j)$ with $j = i - 2^t$ update its data as follows. If $keytemp_i = keytemp_j$ and $datatemp_j \neq \bot$, then set $datatemp_i \leftarrow datatemp_j$.

Every $CPU_i$ now holds $(keytemp_i, datatemp_i) = (key, data_{key})$ for some $key \in K$.

3. Reverse sort (i.e., sort on sourceid$_i$). Return received data to an original requesting CPU. For each layer $L_1, \ldots, L_d$ in the sorting network:

- Let $L_\ell = ((i_1, j_1), \ldots, (i_{m/2}, j_{m/2}))$ be the comparators in the current layer $\ell$.
   - Each $CPU_i$ initializes idtemp $\leftarrow$ sourceid$_i$. In *parallel*, for each $t \in [m/2]$, the corresponding pair of CPUs ($CPU_{i_t}, CPU_{j_t}$) perform the following pairwise sort w.r.t. sourceid.

If idtemp$_{j_t}$ < idtemp$_{i_t}$, then swap (idtemp$_{i_t}$, keytemp$_{i_t}$, datatemp$_{i_t}$) ↔ (idtemp$_{j_t}$, keytemp$_{j_t}$, datatemp$_{j_t}$).

At the conclusion, each $CPU_i$ holds a tuple with (idtemp$_i$, keytemp$_i$, datatemp$_i$) with idtemp$_i$ = $i$, keytemp$_i$ = key$_i$, and datatemp$_i$ = data$_{key_i}$.

4. Output. Each $CPU_i$ outputs output$_i$ := (key$_i$, data$_{key_i}$).

FIG. 13B

Parallel Insertion Routing Protocol Route($m_i$,($msg_i$, $addr_i$))
Input: $CPU_i$ holds: message $msg_i$ with target destination $addr_i$, and global threshold $K$.
Output: $CPU_i$ holds {$msg_j$ : $addr_j = i$}.

Let $lev^* = \log m$ (assumed $\in \mathbb{N}$ for simplicity). Each $CPU_i$ performs the following.
Initialize $M_{i,0} \leftarrow msg_i$. For $t = 1, \ldots, lev^*$:

1. Perform the following symmetric message exchange with $CPU_{i \oplus 2^t}$:

$$M_{i,t+1} \leftarrow \{msg_j \in M_{i,t} \cup M_{i \oplus 2^t, t} : (addr_j)_t = (i)_t\}.$$

2. If $|M_{i,t+1}| > K$ (i.e., memory overflow), then $CPU_i$ aborts.

FIG. 15

OBLIVIOUS PARALLEL RANDOM ACCESS MACHINE SYSTEM AND METHODS

CROSS-REFERENCE TO RELATED APPLICATIONS

This application claims the benefit of U.S. Provisional Patent Application No. 62/031,616 filed Jul. 31, 2014, incorporated by reference.

STATEMENT REGARDING FEDERALLY-SPONSORED RESEARCH OR DEVELOPMENT

This invention was made with government support under AFOSR YIP Award FA9550-10-1-0093, and DARPA and AFRL under contract FA8750-11-2-0211. The U.S. government has certain rights in the invention.

FIELD OF THE INVENTION

The invention relates generally to computer systems and methods which use parallel processing techniques and, more particularly, to a system and methods for converting any parallel random access machine (PRAM) program into an oblivious parallel random access machine (OPRAM) program that simultaneously (i.e, in parallel) processes data while maintaining secure communication in the presence of third party adversaries.

BACKGROUND OF THE INVENTION

Cryptography is directed to secure communication techniques in the presence of third parties, known as adversaries. More generally, cryptography includes constructing and analyzing protocols that block adversaries to ensure data confidentiality, data integrity, authentication, and non-repudiation.

Completeness results in cryptography provide general transformations from arbitrary functionalities described in a particular computational model, to solutions for executing the functionality securely within a desired adversarial model. Certain previous results modeled computation as Boolean circuits, and showed how to emulate the circuit securely gate by gate.

As the complexity of modern computing tasks scales at tremendous rates, it has become clear that the circuit model is not appropriate. In particular, converting "lightweight" optimized programs first into a circuit in order to obtain security is not a viable option. Large effort has recently been focused on enabling direct support of functionalities modeled as Turing machines or random-access machines (RAM). This approach avoids several sources of expensive overhead in converting modern programs into circuit representations. However, it actually introduces a different dimension of inefficiency. RAM (and single-tape Turing) machines do not support parallelism. Thus, even if an insecure program can be heavily parallelized, its secure version will be inherently sequential.

Modern computing architectures are better captured by the notion of a Parallel RAM (PRAM). In the PRAM model of computation, several (polynomially many) CPUs are simultaneously running, accessing the same shared "external" memory. It should be noted that PRAM Central Processing Units (CPUs) can model physical processors within a single multicore system, as well as distinct computing entities within a distributed computing environment.

A machine is said to be memory oblivious, or simply oblivious, if the sequences of memory accesses made by the machine on two inputs with the same running time are identically (or close to identically) distributed. It has been previously shown that a Turing machine can be compiled into an oblivious one with only a logarithmic slowdown in running-time. Roughly ten years later, the notion of Oblivious RAM (ORAM) was proposed, and showed a similar transformation result with polylogarithmic slowdown. In recent years, ORAM compilers have become a central tool in developing cryptography for RAM programs, and a great deal of research has gone toward improving both the asymptotic and concrete efficiency of ORAM compilers. However, for all such compilers, the resulting program is inherently sequential.

ORAM lies at the base of a wide range of cryptographic applications such that parallelism within the corresponding secure application is desired. Hiding correlated lookups while maintaining efficiency is perhaps the core challenge in building oblivious RAMs. In order to bypass this problem, ORAM compilers may heavily depend on the ability of the CPU to move data around, and to update its secret state after each memory access. However, in the parallel setting, having all processors attempt to perform a lookup directly within a standard ORAM construction corresponds to running the ORAM several times without moving data or updating state, which immediately breaks security in all existing ORAM compiler constructions. Furthermore, most cannot afford for the CPUs to take turns accessing and updating the data sequentially.

Therefore, there is a need to formulate cryptographic primitives that directly support PRAM computations while ensuring that secret information is not leaked via the memory access patterns of the resulting program execution.

SUMMARY OF THE INVENTION

According to the invention, any PRAM is converted into an oblivious PRAM (OPRAM), while only inducing a polylogarithmic slowdown to both the total and parallel complexities of the program. More specifically, the invention comprises a compiler that takes any PRAM and converts it into one whose distribution of memory accesses is statistically independent of the data (with negligible error).

The invention is built on a sequential ORAM compiler with a binary tree-based structure. At a high level, data is stored in the structure of a binary tree, where each node of the tree corresponds to a fixed-size bucket that may hold a collection of data items. Each memory cell addr in the original database is associated with a random path (equivalently, leaf) within a binary tree, as specified by a position map $\text{path}_{addr} = \text{Pos}(addr)$.

The schemes maintain three invariants: (1) the content of memory cell addr is found in one of the buckets along the path $\text{path}_{addr}$, (2) given the view of the adversary (i.e., memory accesses) up to any point in time, the current mapping Pos appears uniformly random, and (3) with overwhelming probability, no node in the binary tree will ever "overflow" in the sense that its corresponding memory bucket is instructed to store more items than its fixed capacity.

These invariants are maintained by the following general steps: (1) Lookup: To access a memory item addr, the CPU accesses all buckets down the path $\text{path}_{addr}$, and removes it where found, (2) Data "put-back": At the conclusion of the access, the memory item addr is assigned a freshly random path $\text{Pos}(addr) \leftarrow \text{path}'_{addr}$, and is returned to the root node of the tree, and (3) Data flush: To ensure the root (and any other bucket) does not overflow, data is "flushed" down the tree, for example, by selecting and emptying two random buckets from each level into their appropriate children, or by choosing an independent path in the tree and pushing data items down this path as far as they will go.

In tree-based ORAMs if CPUs access different data items in a time step, they access different paths in the tree, whereas if they attempt to simultaneously access the same data item, they will each access the same path in the tree, blatantly revealing this collision. The invention solves this problem by inserting a CPU-coordination phase that lets the CPUs check-through an oblivious aggregation operation whether two (or more) of them wish to access the same data item. If so, a representative is selected, for example the CPU with the smallest id, to actually perform the memory access, and all the others merely perform "dummy" lookups. Finally, the representative CPU communicates the read value back to all the other CPUs that wanted to access the same data item using an oblivious multi-cast operation. The challenge is in doing so without introducing too much overhead—namely, allowing only (per-CPU) memory, computation, and parallel time polylogarithmic in both the database size and the number of CPUs—and that itself retains memory obliviousness.

For parallel "put-backs", after a memory cell is accessed, the (possibly updated) data is assigned a fresh random path and is reinserted to the tree structure. To maintain the required invariants listed above, the item must be inserted somewhere along its new path, without revealing any information about the path. In tree-based ORAMs, this is done by reinserting at the root node of the tree. However, this single node can hold only a small bounded number of elements (corresponding to the fixed bucket size), whereas the number of processors m—each with an item to reinsert—may be significantly larger. To overcome this problem, instead of returning data items to the root, they are directly inserted into level log m of the tree, while ensuring that they are placed into the correct bucket along their assigned path. Note that level log m contains m buckets, and since the m items are each assigned to random leaves, each bucket will in expectation be assigned exactly 1 item. The challenge in this step is specifying how the m CPUs can insert elements into the tree while maintaining memory obliviousness. For example, if each CPU simply inserts its own item into its assigned node, information is immediately leaked about its destination leaf node. To resolve this issue, the CPUs obliviously route items between each other, so that eventually the ith CPU holds the items to be insert to the ith node, and all CPUs finally perform either a real or a dummy write to their corresponding node.

To prevent overflows and ensure that no new overflows are introduced after inserting m items, m flushes are performed instead of once, and all these m flushes are done in parallel: each CPU simply performs an independent flush. These parallel flushes may lead to conflicts in nodes accessed (e.g., each flush operation likely accesses the root node). As before, this issue is resolved by having the CPUs elect some representative to perform the appropriate operations for each accessed node: however, that this step is required only for correctness, and not for security.

With ORAM lying at the base of a wide range of cryptographic applications, replacing the underlying ORAM with an OPRAM immediately enables parallelism within the corresponding secure application.

As one example, garbled circuits allow a user to convert a circuit and an input into garbled versions in such a way that the garbled circuit can be evaluated on garbled input to reveal an output, but without revealing further information on the circuit or the input. Garbling schemes have found countless applications in cryptography, ranging from delegation of computation to secure multi-party protocols. According to the invention, any OPRAM compiler can be used to attain garbled PRAM, where the time to generate and evaluate the garbled PRAM program scales with the parallel time complexity of the program. In this embodiment, the compiler construction is an extension of the scheme based on identity-based encryption (IBE). According to the invention, the garbled PRAM construction yields constant-round secure protocols where the time to execute the protocol scales with the parallel time of the program being evaluated Another example of the invention is directed to improved, parallelized outsourced data. Standard ORAM has been shown to yield effective, practical solutions for securely outsourcing data storage to an untrusted server. Efficient OPRAM compilers enable these systems to support secure efficient parallel accesses to outsourced data. Specifically, OPRAM procedures securely aggregate parallel data requests and resolve conflicts client-side, minimizing expensive client-server communications. As network latency is a major bottleneck in ORAM implementations, such parallelization may yield significant improvements in efficiency.

In a similar example, use of OPRAM further enables secure access and manipulation of outsourced shared data by multiple (mutually trusting) clients, i.e., multi-client outsourced data. Each client can simply act as an independent CPU, and executes the OPRAM-compiled program corresponding to the parallel concatenation of their independent tasks.

As another example, relying instead on OPRAM opens the door to achieving secure hardware in the multi-processor setting. According to the invention, secure multi-processor architectures are implemented by using ORAM to prevent information leakage via access patterns of the secure processor to the potentially insecure memory.

Yet another application of the invention is directed to secure two-party and multi-party computation of PRAMs. Secure multi-party computation (MPC) enables mutually distrusting parties to jointly evaluate functions on their secret inputs without revealing information on the inputs beyond the desired function output. ORAM has become a central tool in achieving efficient MPC protocols for securely evaluating RAM programs. By instead relying on OPRAM, these protocols can leverage parallelizability of the evaluated programs. In one particular embodiment, OPRAM can reduce the round complexity of existing two-party computation protocols for RAMs to the parallel (and not sequential) complexity of the evaluated program. An advantage of the invention is that large data sets can be securely and privately processed over multiple parties with parallel, distributed procedures as described more fully in the publication entitled "*Large-Scale Secure Computation: Multi-party Computation for (Parallel) RAM Programs*" dated Jun. 6, 2015 authored by Boyle et al., incorporated by reference.

The invention is directed to an expressive model where the number of active CPUs may vary over time (as long as the pattern of activation is fixed a priori). In this sense, PRAMs efficiently capture the best of both RAM and the circuit models (PRAM processor activation patterns can be aligned to match varying width circuit topology).

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which:

FIG. 5A-FIG. 5B illustrates pseudocode for an oblivious parallel data access procedure according to the invention.

FIG. 6A-FIG. 6B illustrates pseudocode for combining processor instructions to perform an update bucket procedure according to the invention.

FIG. 7A-FIG. 7B illustrates pseudocode for combining processor instructions to perform an update bucket procedure according to another embodiment of the invention.

FIG. 10A-FIG. 10B illustrates pseudocode for a space-efficient oblivious data aggregation procedure according to the invention.

FIG. 13A-FIG. 13B illustrates pseudocode for a space-efficient oblivious data multi-casting procedure according to the invention.

FIG. 15 illustrates pseudocode for a space-efficient oblivious data routing procedure according to the invention.

DETAILED DESCRIPTION OF EMBODIMENTS OF THE INVENTION

Figure 1:
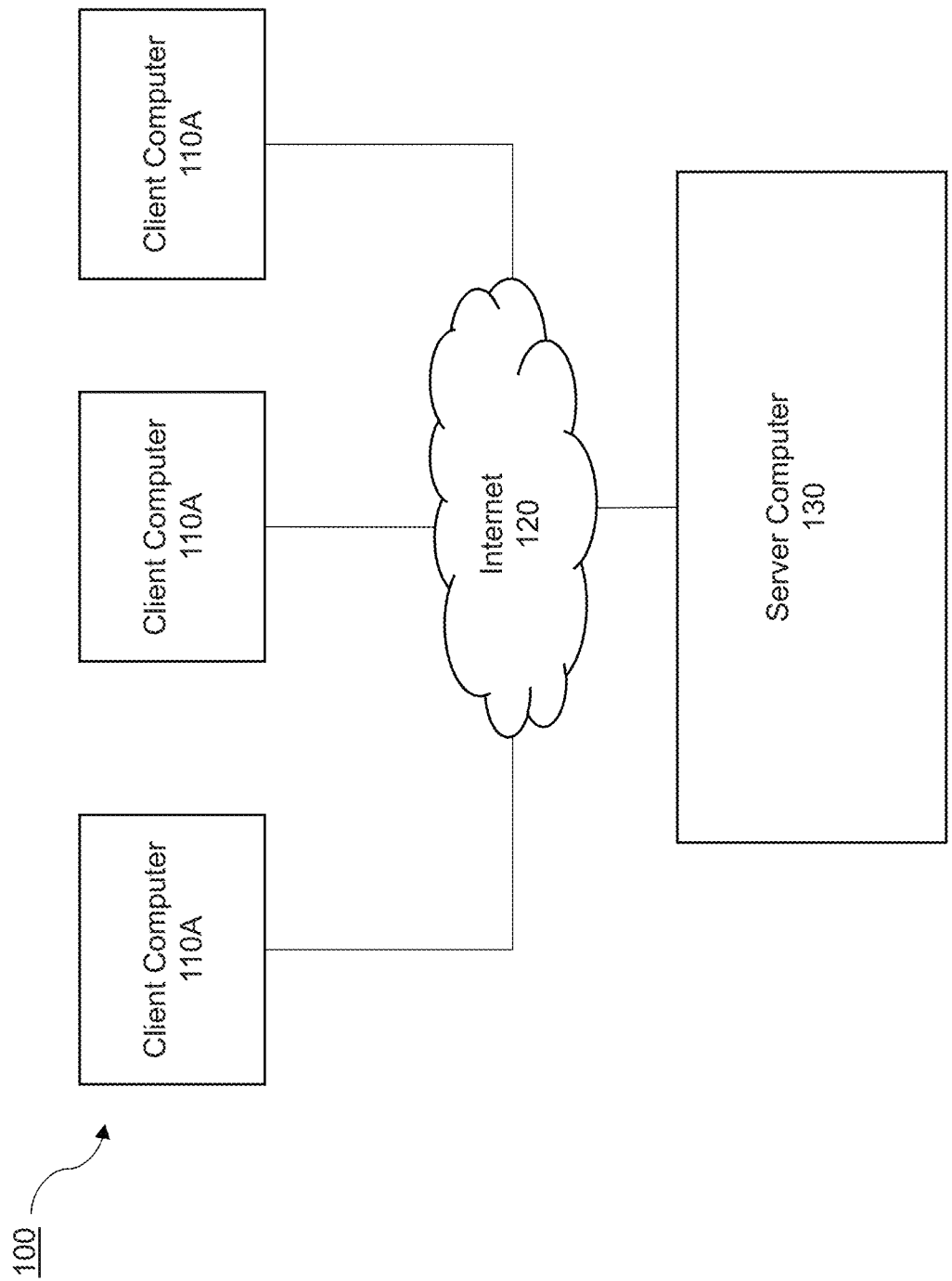
FIG. 1 illustrates an exemplary network system that may be used to implement the invention.
Figure 2:
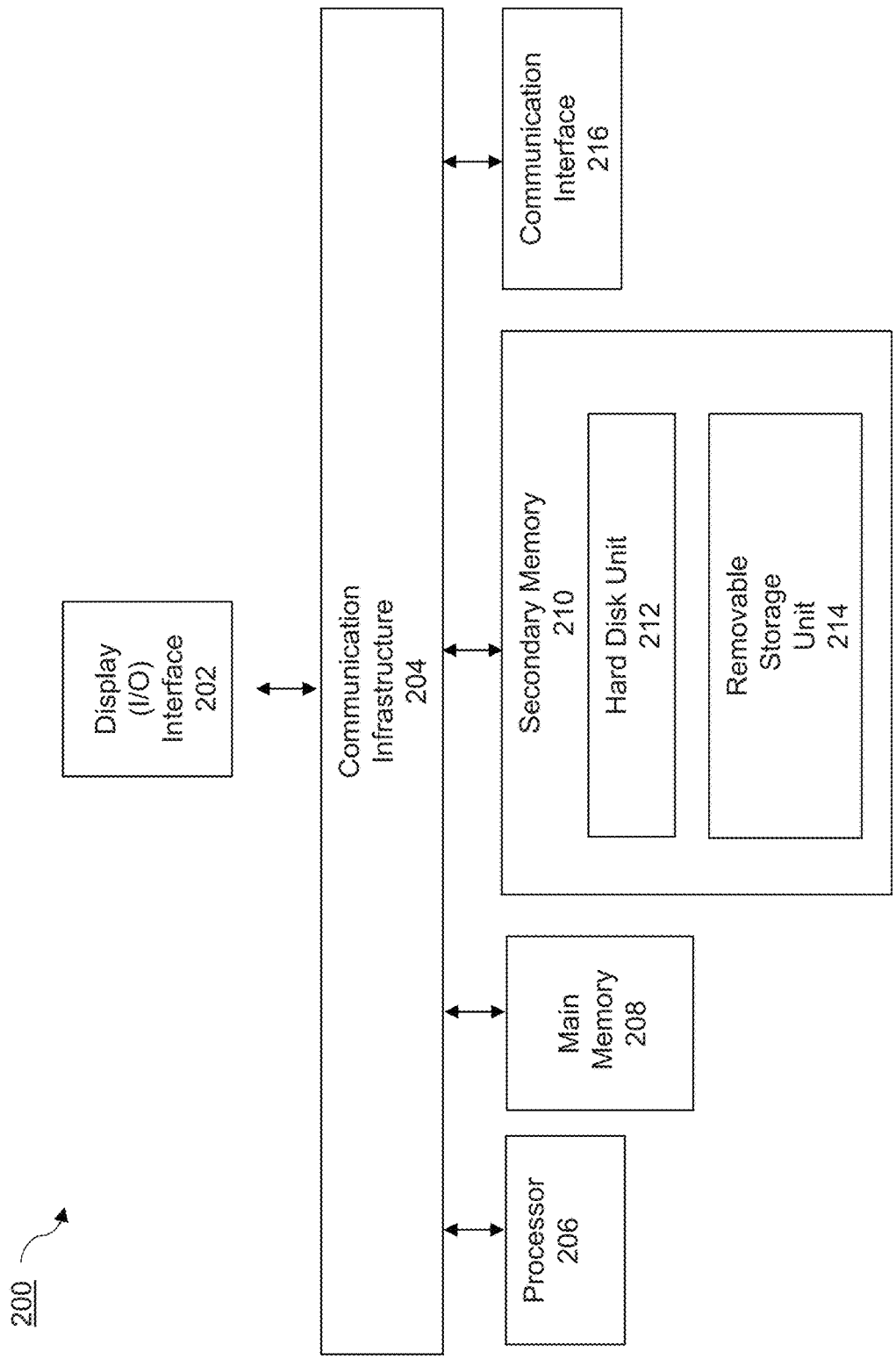
FIG. 2 illustrates an exemplary computer system that may be used to implement the invention.

FIG. 1 illustrates an exemplary communications network system 100 that may be used to implement the invention, for example as computer code processed by a processor such as one similar to that described in reference to FIG. 2.

Specifically, the communications network system 100 includes at least one client computer 110A (also referred to as "client"). The client computer 110A may be any device through the use of which a distributed computing environment may be accessed to perform the invention as detailed below, for example, a traditional computer, portable computer, handheld device, mobile phone, personal digital assistant, smart hand-held computing device, cellular telephone, or a laptop or netbook computer, hand held console or MP3 player, tablet, or similar hand held computer device, such as an iPad®, iPad Touch® or iPhone®. More specifically, the client computer 110A may include one or more components as described in reference to the computer system of FIG. 2.

The one or more client computers 110A establish communication with the Internet 120 (including untrusted web browsers) to one or more servers 130 (also referred to as "server"). A server computer 130 permits access to a collection of computing resources and components that can be invoked to instantiate a machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a machine or virtual machine.

One embodiment of the client computer 110A or server computer 130 may be shown by the exemplary computer system 200 of FIG. 2. Computer system 200 includes an input/output display interface 202 connected to communication infrastructure 204—such as a bus—that forwards data including graphics, text, and information, from the communication infrastructure 204 to other components of the computer system 200. The input/output display interface 202 may be, for example, a display device, a keyboard, touch screen, joystick, trackball, mouse, monitor, speaker, printer, Google Glass® unit, web camera, any other computer peripheral device, or any combination thereof, capable of entering and/or viewing data.

Computer system 200 includes one or more processors 206 (also referred to as "CPU"), which may be a special purpose or a general-purpose digital signal processor configured to process certain information. Computer system 200 also includes non-transitory computer-readable storage medium such as a main memory 208, for example random access memory, read-only memory, mass storage device, or any combination thereof. Computer system 200 may also include a secondary memory 210 such as a hard disk unit 212, a removable storage unit 214, or any combination thereof. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 208, secondary memory 210, communication interface 216, or a combination thereof, function as a non-transitory computer-readable storage medium to store and/or access computer software including computer instructions. Certain embodiments of a computer readable storage medium do not include any transitory signals or waves. For example, computer programs or other instructions may be loaded into the computer system 200 such as through a removable storage device, for example, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency (RF) link, wireless link, or other communication channels.

Computer programs, when executed, enable the computer system 200, particularly the processor 206, to implement the invention according to computer software including instructions.

The computer system 200 of FIG. 2 is provided only for purposes of illustration, such that the invention is not limited to this specific embodiment. It is appreciated that a person skilled in the relevant art knows how to program and implement the invention using any network architecture or computer system including that known as a cloud computer system.

The invention is also directed to computer products, otherwise referred to as computer program products. Computer products store software on any computer useable medium, known now or in the future. Such software, when executed, may implement the methods according to certain embodiments of the invention.

Figure 3:
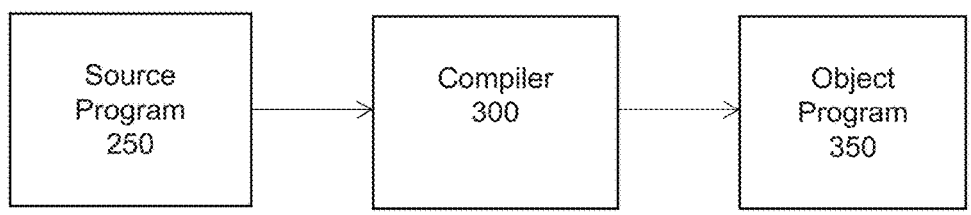
FIG. 3 illustrates a block diagram of certain functions according to the invention.

FIG. 3 illustrates a block diagram of certain functions 225 according to an embodiment of the invention. As shown in FIG. 3, a source program 250 is stored, for example, in memory 210 such as the hard disk unit 212 (see FIG. 2). A compiler 300 may be stored in the hard disk unit 212 and loaded into the main memory 208 by a function of the operating system. The compiler 300, which performs compilation processing according to the invention, is stored in the hard disk unit 212 and loaded into the main memory 208 by a function of the operating system to convert the source program 202 to executable code in the form of an object program 350. Particularly, the compiler 300 is composed of an oblivious aggregation operation 312, oblivious multi-cast operation 314, and oblivious route operation 316 as subsequently described in reference to FIG. 4. The executable code generated by the compiler 300 is preferably stored in the hard disk drive memory 210 and executed by the operating system.

Figure 4:
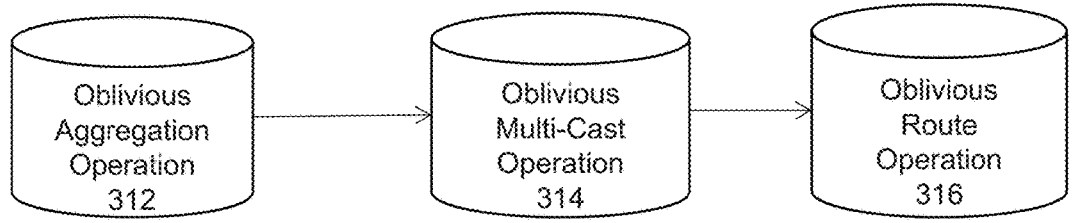
FIG. 4 illustrates a block diagram of a software compiler according to the invention.

FIG. 4 illustrates a block diagram of a software compiler 300 composed of a oblivious aggregation operation 312, oblivious multi-cast operation 314, and oblivious route operation 316, all performed in an oblivious fashion—the sequences of memory accesses made by the machine on two inputs with the same running time are identically (or close to identically) distributed. In other words, the access pattern of a memory-restricted client is hidden on a server with larger memory. The oblivious aggregation operation 312 allows CPUs to efficiently identify a single representative processor and aggregate relevant instructions as described further in reference to FIG. 9, FIG. 10A-FIG. 10B, FIG. 11.

Figure 12:
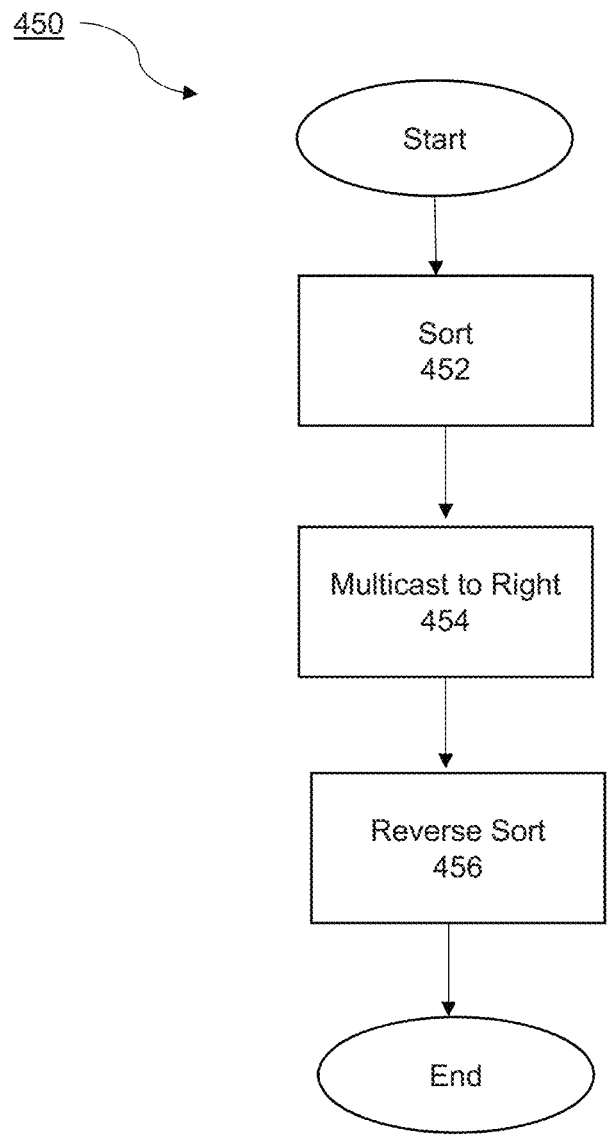
FIG. 12 is a flowchart of steps of the oblivious data multi-cast operation according to the invention.

The oblivious multi-cast operation 314 permits the representative processor to communicate information or data such as the the read value of the data item to all relevant requesting processors as described further in reference to FIG. 12, FIG. 13A-FIG. 13B.

Figure 14:
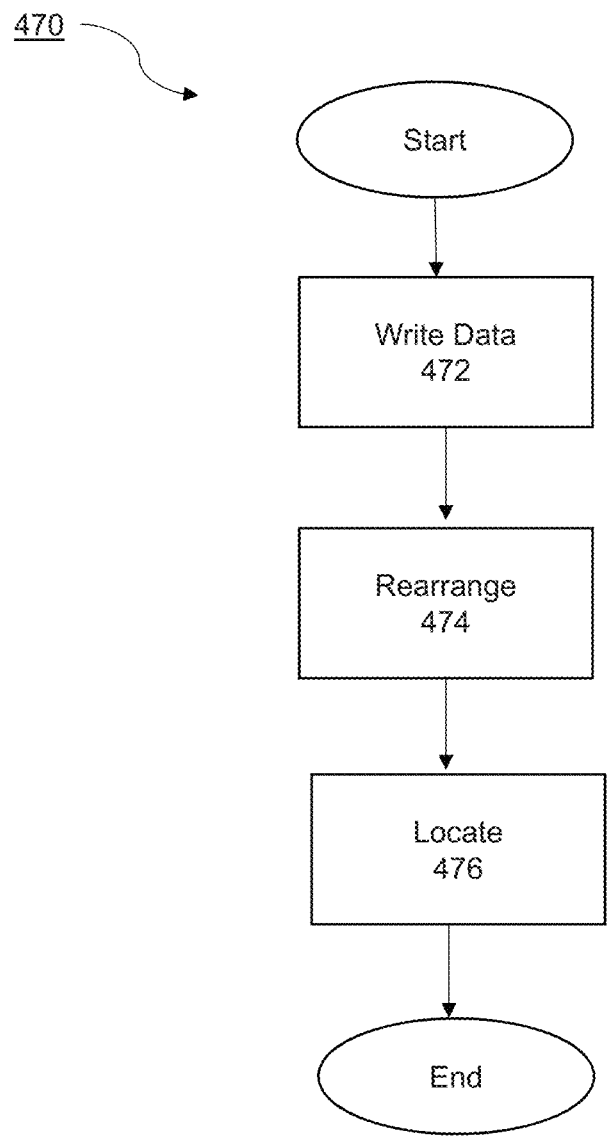
FIG. 14 is a flowchart of steps of the oblivious data route operation according to the invention.
Figure 16:
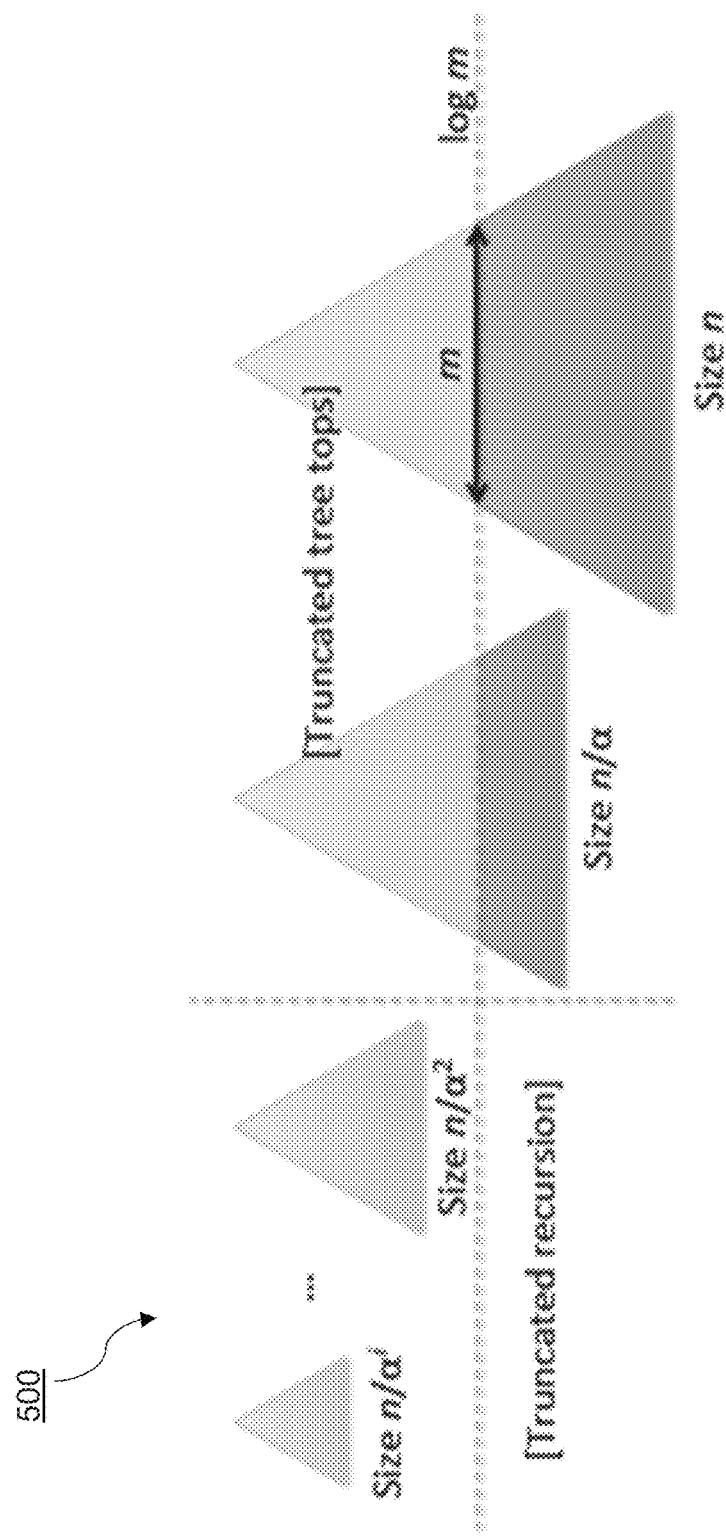
FIG. 16 illustrates trimming of the OPRAM construction according to the invention.

The oblivious route operation 316 permits each CPU to insert its currently held data item into the tree structure that lies along a freshly sampled random path, without revealing information on the path as described more fully in reference to FIG. 14, FIG. 15, FIG. 16. For example, routing a data item between the two or more processors occurs until an ith processor holds the data item to be inserted to an ith node such that the data item is assigned a new position in the binary tree structure to obtain a new node comprising a corresponding path and the data item is inserted at the new node or along the corresponding path without revealing any information about the new node and the corresponding path to obtain a write value of the data item.

A solution for a simplified cast is first presented, where there is no concern for minimizing communication between CPUs or the size of required CPU local memory. In such setting, communicating and aggregating information between all CPUs is "for free".

FIG. 5A-FIG. 5B illustrates pseudocode for an oblivious parallel data access procedure (with no concern for per-round bandwidth/memory). In particular, each Access(r,v) operation is replaced by the modified procedure as defined in FIG. 5A-FIG. 5B. (Here, "broadcast" means to send the specified message to all other processors). An UpdateBuckets operation is performed in Step 4 directed to removing old data from the ORAM database and step 6 directed to flushing the ORAM database.

FIG. 6A-FIG. 6B illustrates pseudocode for combining processor instructions to perform an update bucket procedure according to the invention. As shown in FIG. 6A-FIG. 6B, the UpdateBuckets operation combines CPUs' instructions for buckets for implementation by a single representative CPU. This is used for correctness, not security. A formal description of a full-fledged update bucket procedure can be found in FIG. 7A-FIG. 7B.

Figure 8:
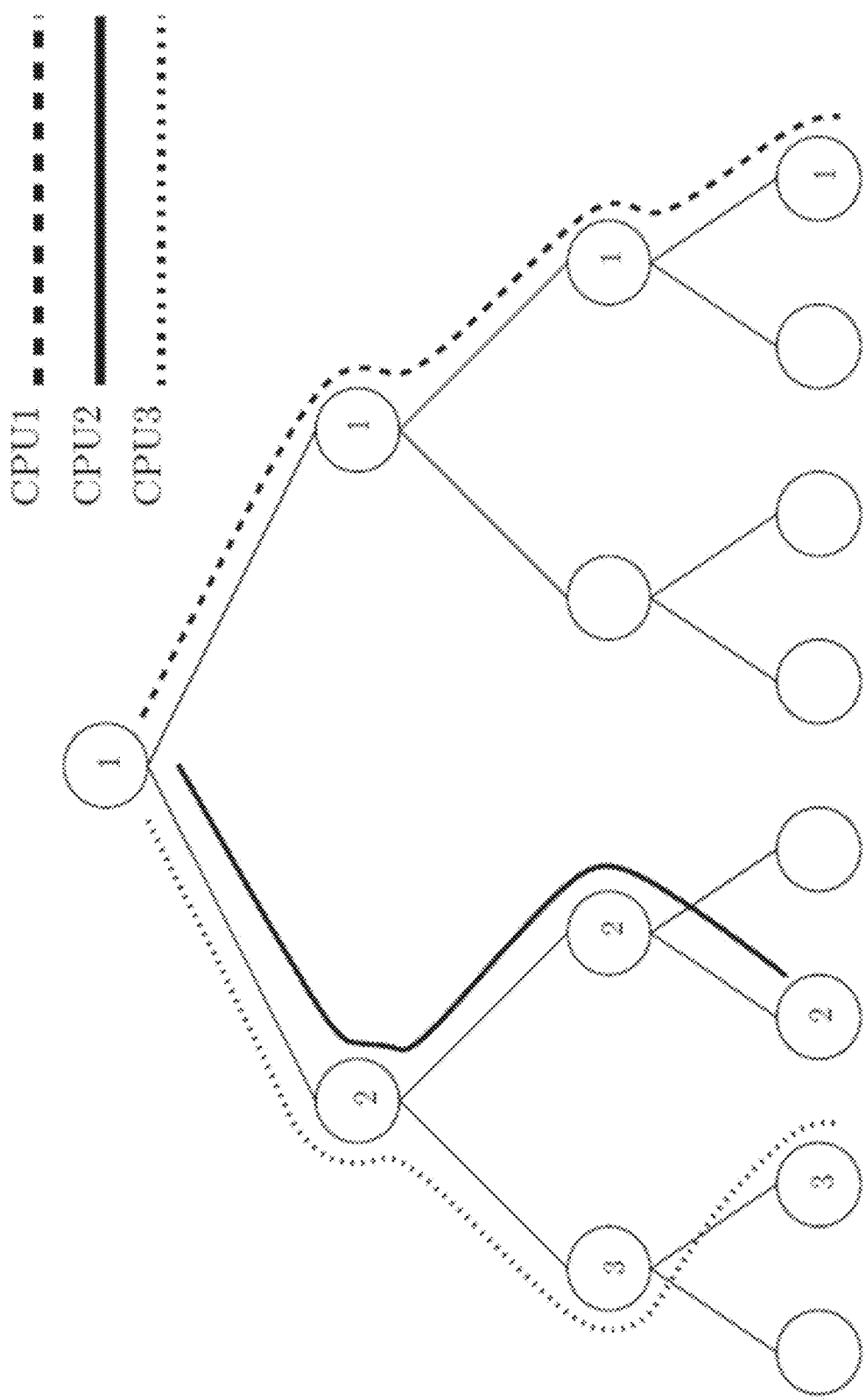
FIG. 8 illustrates a graph of the procedure illustrated in FIG. 6A-FIG. 6B according to the invention.

FIG. 8 illustrates a graph of the procedure illustrated in FIG. 6A-FIG. 6B according to the invention. CPUs 1-3 each wish to modify nodes along their paths as seen in FIG. 8. For each overlapping node, the CPU with lowest id receives and implements the aggregated commands for the node.

Figure 9:
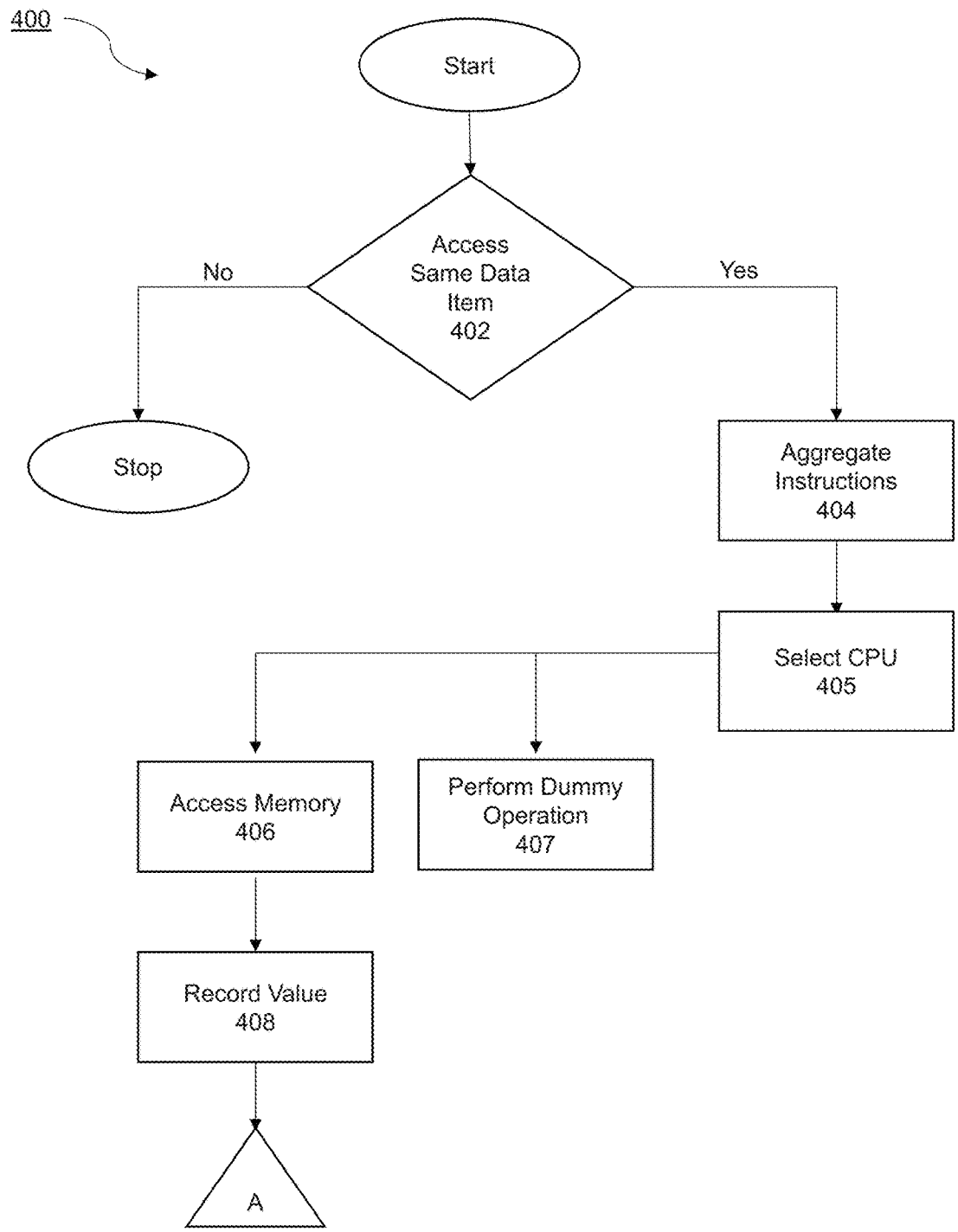
FIG. 9 is a flowchart of steps of the oblivious aggregation operation according to the invention.
Figure 11:
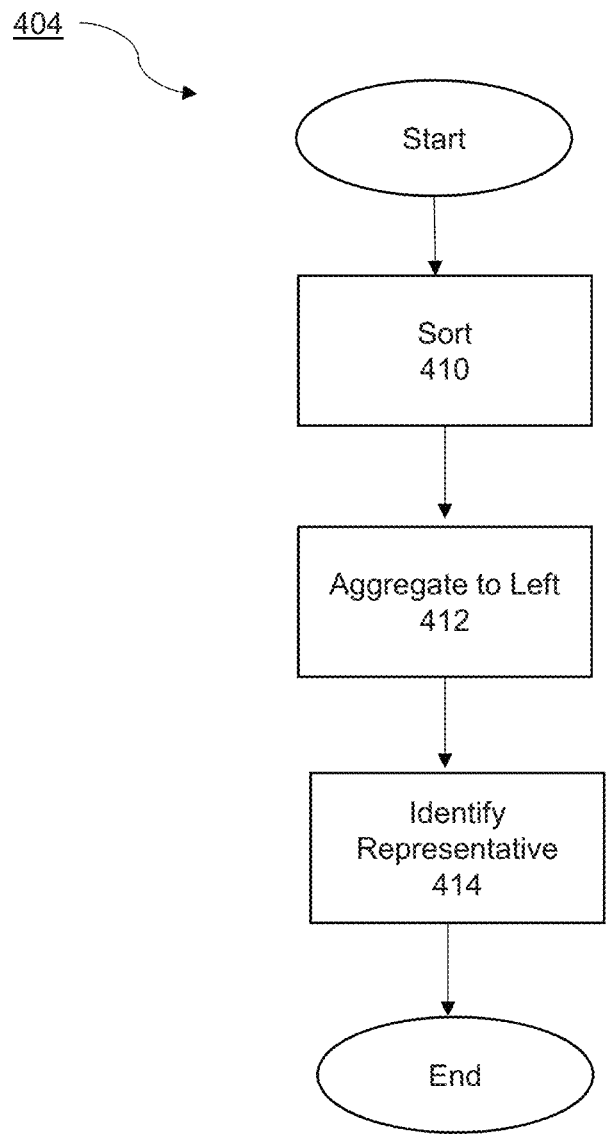
FIG. 11 is a flowchart of certain steps of the oblivious aggregation operation according to the invention.

FIG. 9 is a flowchart of steps 400 of the oblivious aggregation operation. In particular, when a simultaneous request is made by more than one processor to access a data item at step 402, instructions of all processors are aggregated at step 404 and a processor is selected at step 405 to be a representative processor. At step 406, the representative processor accesses a memory to obtain a read value of the data item stored in a node of a binary tree structure. It is contemplated that each node retains a plurality of data items. At this same time, the other processors perform a dummy read operation at step 407 of accessing the memory to obtain the read value of the data item. The representative or selected processor records the read value of the data item at step 408. Defining a representative or selected processor may also be done to perform an operation within the binary tree structure when a conflict occurs.

FIG. 10A-FIG. 10B illustrates pseudocode for a space-efficient oblivious data aggregation procedure according to the invention. To achieve oblivious data aggregation, the CPUs sort their data list with respect to the corresponding key values as shown by step 410 of FIG. 11, which illustrates a flow chart of a portion of the oblivious aggregation procedure according to the invention. Each CPU i holds a set of distinct keys such that any data or subset of data associated with the same key can be aggregated by an aggregation function Agg. This can be achieved via an implementation of a log(m)-depth sorting network, and provides the useful guarantee that all data pertaining to the same key are necessarily held by an block of adjacent CPUs. As shown by step 412 of FIG. 11, data is passed among CPUs in a sequence of log(m) steps such that at the conclusion the "left-most" (i.e., lowest indexed) CPU in each key-block learns the aggregation of all data pertaining to this key. Explicitly, in each step i, each CPU sends all held information to the CPU $2^i$ to the "left" of itself, and simultaneously accepts any received information pertaining to its key. At step 414, each CPU learns whether it is the "left-most" representative in each key-block, by simply checking whether its left-hand neighbor holds the same key. From here, the CPUs have succeeded in aggregating information for each key at a single representative CPU. Lastly, the original sorting procedure is reversed to return the aggregated information to one of the CPUs who originally requested it, i.e., the oblivious data multi-cast operation according to the invention described more fully below.

FIG. 12 is a flowchart of steps of the oblivious data multi-cast operation according to the invention. In particular, the representative processor communicates information or data such as the the read value of the data item to all relevant requesting processors. Namely, a subset of processors must deliver information to (unknown) collections of other processors who request it. As can be seen in FIG. 12, the original sorting procedure described in reference to FIG. 9, FIG. 10A-FIG. 10B and FIG. 11 is reversed to multi-cast the aggregated information to one of the CPUs who originally requested it. At step 452 the CPUs sort their data list with respect to the corresponding key values. Data is passed among CPUs in a sequence of log(m) steps such that at the conclusion the "right-most" (i.e., highest indexed) CPU in each key-block learns the aggregation of all data pertaining to this key as shown by step 454. Explicitly, in each step i, each CPU sends all held information to the CPU 2' to the "right" of itself, and simultaneously accepts any received information pertaining to its key. Each CPU learns whether it is the "right-most" representative in each key-block, by simply checking whether its right-hand neighbor holds the same key in order to communicate or multi-cast information for each key to all requesting CPUs at step 456. FIG. 13A-FIG. 13B illustrates pseudocode for a space-efficient oblivious data multi-casting procedure according to the invention.

FIG. 14 is a flowchart of steps 470 of the oblivious route operation that enables each CPU to insert its currently held data item into the bucket at level log m of the tree that lies along a freshly sampled random path, without revealing information on the path. In particular, data items are delivered to their target locations via a fixed-topology routing network. Namely, as shown by step 472, the m processors $CPU_1, \ldots, CPU_{m_i}$ first writes the relevant m data items $msg_i$ (and their corresponding destination addresses $addr_i$) to memory in fixed order, and then rearranges them at step 474 in log m sequential rounds in order to locate them at the proper locations via the routing network as shown by step 476. At the conclusion of the routing procedure, each node j holds all messages $msg_i$ for which $addr_i=j$.

For simplicity, it is assumed $m=2^l$ for some $l \in \mathbb{N}$. The routing network has depth l in each level $t=1, \ldots, l$, each node communicates with the corresponding node whose id agrees in all bit locations except for the t-th (corresponding to its t-th neighbor in the log m-dimensional Boolean hypercube). These nodes exchange messages according to the t-th bit of their destination addresses $addr_i$, formally described in FIG. 15. After the t-th round, each message $msg_i$ is held by a party whose id agrees with the destination address $addr_i$ in the first t bits. Therefore, at the conclusion of rounds, all messages are properly delivered. Again, FIG. 15 illustrates pseudocode for an oblivious data routing procedure according to the invention in which a fixed-topology routing network delivers m messages originally held by m processors to their corresponding destination address within [m].

The "Heavy-OPAccess" structure of the OPRAM presented above in reference to FIG. 5A-FIG. 5B within the simplified "free CPU communication" setting is combined together with the (oblivious) Route, OblivAgg, and Obliv-MCast procedures constructed above. In one embodiment of the invention, the number of CPUs m is fixed; however, it can be modified in a straightforward fashion to the more general case (as long as the activation schedule of CPUs is a-priori fixed and public). In order to ensure the Position Map information (associating data items to paths in the tree, and which itself, must be accessed obliviously) is smaller than the database itself, data items are divided into contiguous blocks of constant size a; blocks are each stored as one unit, are are assigned a single path in the tree. This yields a Position Map of size $n/\alpha$, whose access patterns can then be protected via a recursive application of the original ORAM scheme.

In one embodiment of an OPRAM compiler O, each Access(r,v) operation is replaced by a sequence of operations defined by subroutine OPAccess(r,v), which is constructed over the following subsections. The OPAccess procedure begins with m CPUs, each with a requested data cell $r_i$ (within some $\alpha$-block $b_i$) and some action to be taken (either $\perp$ to denote read, or $v_i$ to denote rewriting cell $r_i$ with value $v_i$).

For conflict resolution, OblivAgg is run on inputs to select a unique representative $rep(b_j)$ for each queried block $b_j$ and aggregate all CPU instructions for this $b_j$.

For recursive access to that position map, each representative CPU samples a fresh random in the tree and performs a (recursive) Read/Write access command on the position map database to fetch the current position map value l for block $b_i$ and rewrite it with the newly sampled value. Each dummy CPU performs an arbitrary dummy access.

For look up of current memory values, each CPU fetches memory from the database nodes down the path to leaf. When $b_i$ is found, it copies its value $v_i$ into local memory. Each dummy CPU chooses a random path and makes analogous dummy data fetches along it, ignoring all read values (again, simultaneous data reads do not yield conflicts).

Old data is then removed. For each level in the tree, instructions are aggregated across CPUs accessing the same "buckets" of memory (corresponding to nodes of the tree) on the server side. Each representative CPU begins with the instruction of "remove block b if it occurs" and dummy CPUs hold the empty instruction (aggregation is as before, but at bucket level instead of the block level). For each bucket to be modified, the CPU with the smallest id from those who wish to modify it executes the aggregated block-removal instructions for the bucket (again, this aggregation step is purely for correctness and not security).

The updated data is then inserted into the database in parallel and the ORAM database is flushed. In parallel, each CPU initiates an independent flush of the ORAM tree—this corresponds to selecting a random path down the tree, and pushing all data blocks in this path as far as they will go. To implement the simultaneous flush commands, as before, commands are aggregated across CPUs for each bucket to be modified, and the CPU with the smallest id performs the corresponding aggregated set of commands. For example, all CPUs wish to access the root node in their flush; the aggregation of all corresponding commands to the root node data is executed by the lowest-numbered CPU who wishes to access this bucket.

Output is returned by running OblivMCast on inputs to communicate the original (pre-updated) value of each data block $b_i$ to the subset of CPUs that originally requested it.

In the case that the number of CPUs m is fixed and known a priori, the OPRAM construction can be directly trimmed in two places. FIG. 16 illustrates trimming of the OPRAM construction according to the invention. With respect to trimming tops of recursive data trees it is noted that data items are always inserted into the OPRAM trees at level log m, and flushed down from this level. Thus, the top levels in the ORAM tree are never utilized. In such case, the data buckets in the corresponding tops of the trees, from the root node to level log m for this bound, can simply be removed without affecting the OPRAM. With respect to truncating recursion, in the t-th level of recursion, the corresponding database size shrinks so that oblivious data accesses can be achieved via local CPU communication without needing any tree lookups or further recursion.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A secure computer method enabling two or more processors to simultaneously access a shared external memory, the method comprising the steps of:
   selecting a processor from two or more processors to obtain a selected processor and one or more unselected processors, said selecting step occurring when each of the two or more processors require simultaneous access to a data item;
   aggregating by the selected processor instructions of each of the two or more processors to obtain aggregated instructions;
   accessing a memory by the selected processor to obtain a read value of the data item, wherein the data item is stored in a node of a binary tree structure, the node comprising a collection of data items;
   recording by the selected processor the read value of the data item;
   removing by the selected processor the data item from both the collection of the note and all other collections of other nodes along a path of the node;
   communicating by the selected processor to the one or more unselected processors the read value of the data item;
   routing the data item between the two or more processors until an ith processor holds the data item to be inserted to an ith node such that the data item is assigned a new position in the binary tree structure to obtain a new node comprising a corresponding path; and
   inserting by the selected processor the data item at the new node or along the corresponding path without revealing any information about the new node and the corresponding path to obtain a write value of the data item.

2. The secure computer method according to claim 1, wherein the selected processor has a smallest id selected from the two or more processors.

3. The secure computer method according to claim 1, wherein said accessing step further comprises the step of performing by the one or more unselected processors a dummy read operation of accessing the memory to obtain the read value of the data item.

4. The secure computer method according to claim 1, wherein the node retains a plurality of data items.

5. The secure computer method according to claim 1, wherein the corresponding path is defined by log m of the binary tree structure, with m representing a number of processors.

6. The secure computer method according to claim 1, wherein said inserting step further comprises the step of performing by the one or more unselected processors a dummy write operation inserting the data item at the new node or along the corresponding path.

7. The secure computer method according to claim 1 further comprising the step of:
   flushing simultaneously by the two or more processors the binary tree structure so that each node of the binary tree structure is not overflowing with data items.

8. The secure computer method according to claim 1 further comprising the step of:
   electing a processor from the two or more processors to perform an operation within the binary tree structure when a conflict occurs.

9. The secure computer method according to claim 1, wherein said aggregating step further comprises the steps of:
   sorting by a processor a data list according to one or more key values, wherein each processor has an associated data list and each processor holds a block of distinct key values;
   passing between the two or more processors a sequence of log(m) steps such that at the conclusion the "left-most" (i.e., lowest indexed) processor in each block aggregates all data pertaining to a particular key to obtain aggregated data; and
   learning by each processor that it is the "left-most" processor in each block.

10. The secure computer method according to claim 9, wherein said sorting step further comprises the step of implementing a log(m)-depth sorting network with all data pertaining to a same key are held by adjacent processors.

11. The secure computer method according to claim 9, wherein said learning step further includes the step of checking by each processor that its left-hand neighbor holds a same key.

* * * * *